United States Patent [19]

Sugiyama et al.

[11] Patent Number: 5,576,862
[45] Date of Patent: Nov. 19, 1996

[54] POSITIVE ORIENTATIONS OF LIQUID CRYSTAL MOLECULES IN A MULTI-DOMAIN LIQUID CRYSTAL DISPLAY CELL

[75] Inventors: Takashi Sugiyama; Yasuo Toko, both of Yokohama; Shunsuke Kobayashi, Tokyo; Yasufumi Iimura, Asaka, all of Japan

[73] Assignee: Stanley Electric Co., Ltd., Tokyo, Japan

[21] Appl. No.: 265,654

[22] Filed: Jun. 24, 1994

[30] Foreign Application Priority Data

Jun. 29, 1993 [JP] Japan .................................. 5-159606
Dec. 24, 1993 [JP] Japan .................................. 5-326990

[51] Int. Cl.$^6$ .................................................. G02F 1/1337
[52] U.S. Cl. ................................................. 359/75; 359/76
[58] Field of Search ................................ 359/75, 76, 87

[56] References Cited

U.S. PATENT DOCUMENTS

| | | | |
|---|---|---|---|
| 5,032,009 | 7/1991 | Gibbons et al. | 359/76 |
| 5,136,407 | 8/1992 | Clerc | 359/55 |
| 5,151,808 | 9/1992 | Yamazaki et al. | 359/54 |
| 5,229,873 | 7/1993 | Hirose et al. | 359/55 |
| 5,309,264 | 5/1994 | Lien et al. | 359/87 |
| 5,389,698 | 2/1995 | Chigrinov et al. | 359/75 |
| 5,453,862 | 9/1995 | Toko et al. | 359/76 |
| 5,508,832 | 4/1996 | Shimada | 359/75 |

FOREIGN PATENT DOCUMENTS

| | | |
|---|---|---|
| 0497619A2 | 8/1992 | European Pat. Off. . |
| 0589264A2 | 3/1994 | European Pat. Off. . |
| 5-281545 | 10/1993 | Japan ................................ 359/87 |

OTHER PUBLICATIONS

Patent Abstracts Of Japan, vol. 013, No. 583 (P-981) Dec. 22, 1989 & JP-A-01 245 223 (Nippon Telegraph & Telephone Corp.) Sep. 29, 1989.

Patent Abstracts Of Japan, vol. 010, No. 212 (P-480) Jul. 24, 1986 & JP-A-61 051 124 (Matsushita Electric Ind. Co., Ltd.) Mar. 13, 1986.

SID 1993 International Symposium, Digest Of Technical Papers vol. XXIV, Seattle (US), May 18–20, 1993, Lien et al "Two–Domain TN–LCDs Fabricated By Parallel Fringe Method".

IBM Technical Disclosure Bulletin, vol. 36, No. 12, Dec. 1993.

Jpn. J. Appl. Phys. vol. 31, (1992) pp. 2155–2164, Part 1, No. 7, Jul. 1992, Surface–Induced Parallel Alignments Of Liquid Crystals By Linearly Polymerized Photopolymers, Martin Schadt et al.

*Primary Examiner*—William L. Sikes
*Assistant Examiner*—Charles Miller
*Attorney, Agent, or Firm*—Frishauf, Holtz, Goodman, Langer & Chick

[57] ABSTRACT

A liquid crystal display cell comprising a pair of substrates, a liquid crystal material sandwiched between the pair of substrates, and an optical polarization memory film provided on one or both of the substrates. The optical polarization memory film is exposed by polarized lights to produce a positive orientation means including a multiple micro domains. In the micro domains, orientation direction is uniform in each domain and substantially isotropic as a whole. The visual angular dependency is eliminated. No rubbing treatment is done, and problems caused by rubbing can be solved.

30 Claims, 13 Drawing Sheets

5,576,862

POSITIVE ORIENTATIONS OF LIQUID CRYSTAL MOLECULES IN A MULTI-DOMAIN LIQUID CRYSTAL DISPLAY CELL

CROSS REFERENCE TO THE RELATED APPLICATIONS

The subject matter of this invention is related with the disclosure of U.S. patent applications Ser. No. 08/115,441 filed on Sep. 1, 1993, Ser. No. 08/191,554 filed on Feb. 4, 1994, and Ser. No. 08/191,636 filed on Feb. 4, 1994, now U.S. Pat. No. 5,479,282.

BACKGROUND OF THE INVENTION

1. Field of the Invention

The present invention relates to a liquid crystal display cell and a manufacturing method thereof, and more particularly to a liquid crystal display cell and a manufacturing method thereof capable of improving the visual angle.

2. Description of the Related Art

In a liquid crystal display cell or liquid crystal cell utilized for a liquid crystal display, a particular orientation state of liquid crystal molecules is changed to a different state by some external action as electric field. The change in the optical property caused by the change of orientation of the liquid crystal molecules is utilized as a visual change in a display. Usually, for orientating liquid crystal molecules in a particular state, the surface of the glass substrates which sandwich a liquid crystal layer are subjected to orientation treatment.

In a conventional liquid crystal cell of twisted nematic (TN) type, the orientation treatment is achieved by rubbing a pair of glass substrates (having electrodes, an orientation layer, and the like on its surface,) which sandwich a liquid crystal layer with a cotton cloth or the like in one direction, i.e. a so-called rubbing treatment.

When rubbing treatment is done to substrates, the direction of rubbing is arranged in such a way that the rubbing directions of the upper and lower substrates are orthogonal to each other. When the liquid crystal cell is of negative display type, parallel polarizers are disposed in such a way that one of the rubbing directions is parallel to the polarization axis of a neighboring polarizer. In the case of positive display, crossed polarizers are disposed in such a way that polarization axes are parallel to the rubbing directions of neighboring substrates.

When orientation treatment is done by rubbing as described above, orientated direction of the liquid crystal molecules become uniform on the substrate surface. Thus, when the display is viewed by an observer, there occurs a visual angle dependency of display, that the display can easily be observed only from a certain limited range of observation. Reference can be made on the visual angle dependency of display to the U.S. patent applications Ser.No. 08/115,441 filed on Sep. 1, 1993, Ser. No. 08/191, 554 filed on Feb. 4, 1994, and Ser. No. 08/191,636 filed on Feb. 4, 1994.

Further, rubbing may generate electrostatic charge, which may cause dielectric breakdown of the orientation film, or insufficient orientation of liquid crystal molecules thereat, and hence, a display defect. In a liquid crystal cell employing active (drive) matrix, electrostatic charge generated by rubbing may cause breakage of drive elements or wirings formed thereon.

Yet further, a vast amount of fine particles generated by rubbing treatment may attach to the substrates by electrostatic force and may become the cause of inaccurate gap of the liquid crystal cell and/or of display defects as black points and white points.

SUMMARY OF THE INVENTION

An object of the present invention is to provide a liquid crystal display cell and a manufacturing method thereof not only capable of dispensing with rubbing treatment which causes visual angle dependency and other sources of product defect such as display defects, cell breakage, or the like, but also provided with uniform visual angle characteristics and with a high quality display.

The present inventors have proposed a multi-domain liquid crystal display having a display unit including a multiplicity of micro domains. In each micro domain, the orientation of liquid crystal molecules can be considered as uniform. The orientation, however, changes from micro domain to micro domain. Such a multi-domain structure can be obtained by obviating the orientation treatment.

According to an aspect of the present invention, there is provided a liquid crystal display cell comprising a pair of substrates, a chiral nematic liquid crystal layer or a nematic liquid crystal layer sandwiched between said pair of substrates, an optical polarization memory film on at least one of said pair of substrates, forming a positive orientation structure to yield a multiplicity of micro domains with different orientation directions.

According to another aspect of the present invention, there is also provided a liquid crystal display cell having the similar construction as described above, and such a positive orientation structure on at least one of said pair of substrates that each pixel region comprises a set of at least four micro domains with different orientation direction to one another. The orientation directions of adjacent micro domains in said four micro domains form an angle of 90° or 180° with respect to each other.

The present invention also provides a liquid crystal display cell having an orientation structure on at least one of the substrates and a pair of electrodes formed on the substrates and having a cut-off provided in a part of one electrode to control orientation of liquid crystal molecules.

At least one of the pair of substrates is provided with positive orientation structure for each of the great amount of micro domains, in which each micro domain has a single direction of orientation of liquid crystal molecules. At the same time, orientation direction of each of the great amount of micro domains is so selected that the substrate as a whole has a multi-domain structure with a substantially isotropic visual angle characteristics. There will be no problem generated from rubbing since no rubbing treatment is performed.

DESCRIPTION OF THE PREFERRED EMBODIMENTS

A liquid crystal display and a method of manufacturing thereof according to an embodiment of the present invention will be described referring to the figures. As for fundamental configurations and fundamental processes of a liquid crystal display except the orientation structure, prior art technique can be applied. Reference may be made to the U.S. patent applications Ser. No. 08/115,441 filed on Sep. 1, 1993, Ser. No. 08/191,554 filed on Feb. 4, 1994, and Ser. No. 08/191,636 filed on Feb. 4, 1994, now U.S. Pat. No. 5,479,282 which are incorporated herein by reference.

FIGS. 1A to 1F show enlarged plan views of orientation states on substrates according to an embodiment of the present invention. Arrows indicate orientation directions for liquid crystal molecules.

A multiplicity of micro domains 1 which are minimum units for constituting a pixel are provided on a surface of a substrate. In each micro domain, liquid crystal molecules adjacent to a substrate are orientated substantially along one direction. Orientation treatment is performed to align or orientate directions of liquid crystal molecules within each of the micro domains. The orientation directions of an assembly of the micro domains on the surface of the substrate as a whole, however, are arranged to direct liquid crystal molecules effectively along every direction in a plane of the substrate. The surface of the substrate, macroscopically, can thus be considered to be isotropic or random. It is not necessary to have a great number of orientation directions to have a substantially isotropic characteristics. For example, several directions can serve as random orientation for achieving substantially isotropic orientation. "Substantially isotropic" orientation is to be compared with unidirectional orientation of the prior art.

Figure 1A:
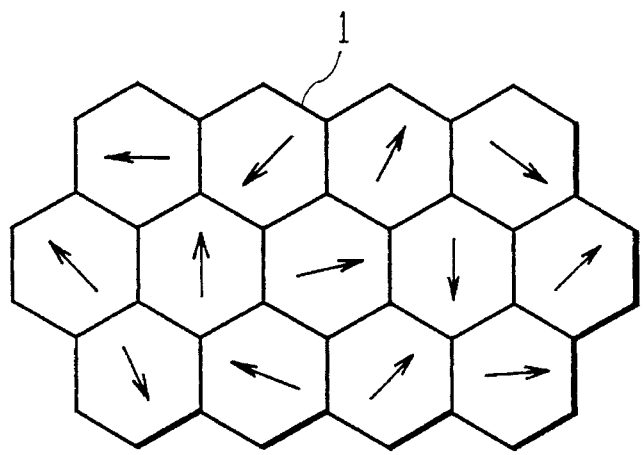
FIGS. 1A to 1F are enlarged diagrams showing treated states of orientation directions of substrates according to an embodiment of the present invention.
Figure 1B:
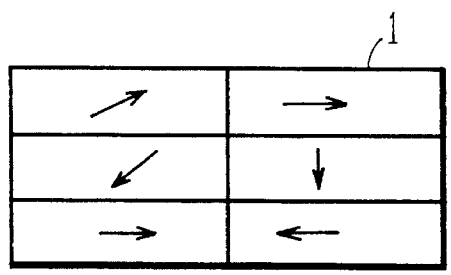
Figure 1C:
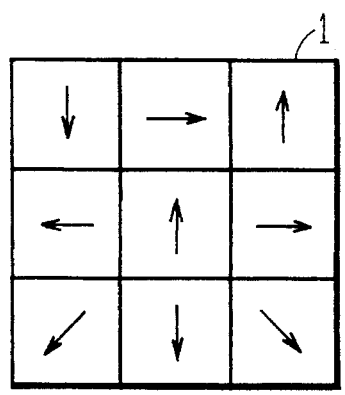
Figure 1D:
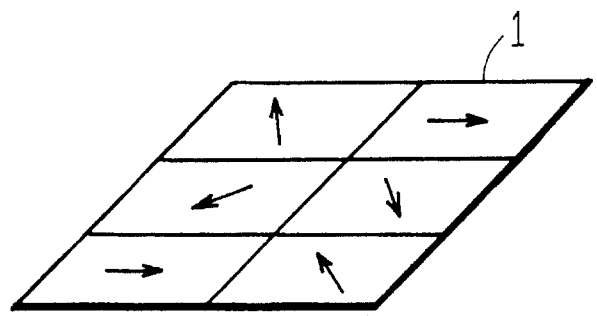
Figure 1F:
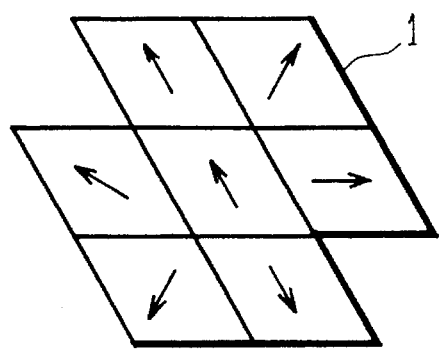
Figure 1E:
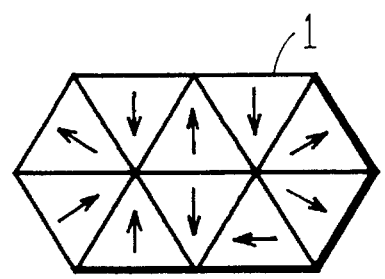

Dimension of each micro domain 1 is to be designed in a way that a unit pixel contains a sufficiently large number of micro domains. For example, it may be designed to contain several to several tens of micro domains within an area of the order of 100×300 $\mu m^2$ which is a typical dimension of a unit pixel. To fill a wide area of a pixel with micro domains having the same area, each domain is preferably shaped to be a regular hexagon as shown in FIG. 1A, a rectangle as shown in FIG. 1B, a square as shown in FIG. 1C, a parallelogram as shown in FIG. 1D, a rhombus as shown in FIG. 1F, a triangle as shown in FIG. 1E, or the like.

One of methods of manufacturing a substrate provided with an orientation means as shown in FIGS. 1A to 1F utilizes an optical polarization memory film.

Figure 2A:
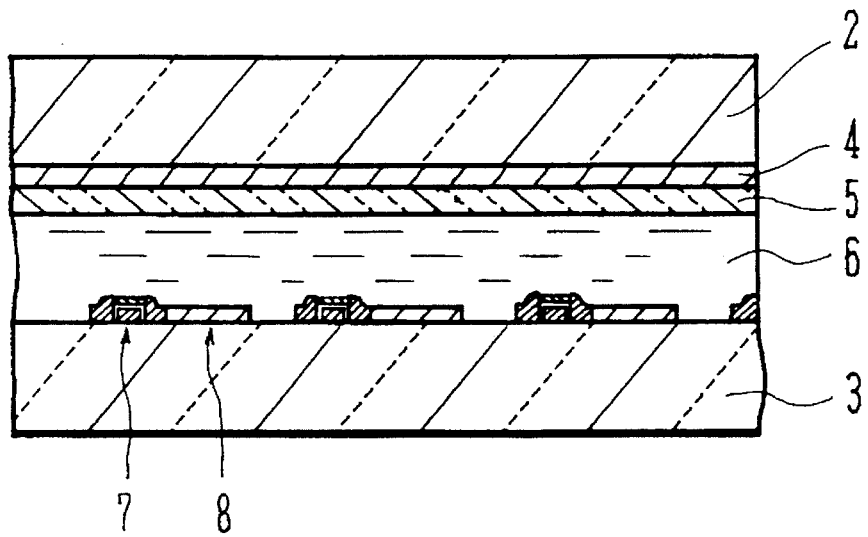
FIGS. 2A and 2B are schematic sectional views of a structure of a liquid crystal display cell according to an embodiment of the present invention.
Figure 2B:
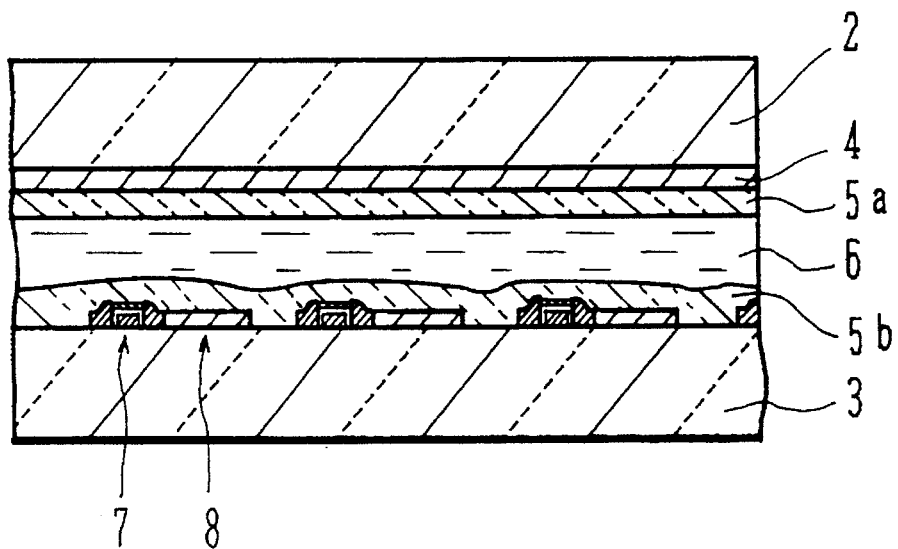

FIGS. 2A and 2B show sectional views showing construction of a liquid crystal cell according to an embodiment of the present invention. One glass substrate 3 having a thin film transistor (TFT) driving element 7 and a pixel electrode 8 and another glass substrate 2 having a common transparent electrode (common electrode) 4 are disposed to face each other, sandwiching a liquid crystal layer 6. FIG. 2A shows an example of a liquid crystal display cell having a positive orientation means formed of an optical polarization memory film 5 only on one of the glass substrates. In the figure, the memory film 5 is coated on the common electrode 4. For obtaining a flatter underlie, it is advantageous to use the common electrode substrate. FIG. 2B shows an example of a liquid crystal display cell having positive orientation means formed of optical polarization memory films 5a and 5b on both of the glass substrates. Orientation structure on both the substrates will enable easier and more stable orientation of liquid crystal molecules. Description will be made hereunder of a method of forming a substrate provided with orientation means for each micro domain utilizing the optical polarization memory film.

Firstly, an optical polarization memory film 5 is coated on one side of one or both of the pair of transparent glass substrates 2 and 3 constituting a liquid crystal cell. The one side denotes a side of the substrate which touches with the liquid crystal material 6. The optical polarization memory film 5 memorizes direction of polarization in the film when it is irradiated with a polarized beam of a particular wavelength. The liquid crystal material 6 in contact with the optical polarization memory film 5 is orientated along a direction corresponding to the direction of polarization memorized in the film 5. It is also possible to give a tilt to the liquid crystal molecules by the memory.

The optical polarization memory film can be formed of:

1) silicone poly-imide doped with diazoamin dye (for example, see Wayne M. Gibbons et al., NATURE Vol. 351(1991), p49), 2) poly-vinyl-alcohol (PVA) doped with azo-based dye (for example, see Jpn. J. Appl. Phys., Vol. 32, 1993, pp. L93–L96), and 3) photopolymerized photopolymer (for example, see Martin Schadt et al., Jpn. J. Appl. Phys., Vol. 31, 1992, pp. 2155–2164), etc. These papers are also incorporated herein by reference.

Now a method of orientation treatment of the optical polarization memory film will be described.

Figure 3:
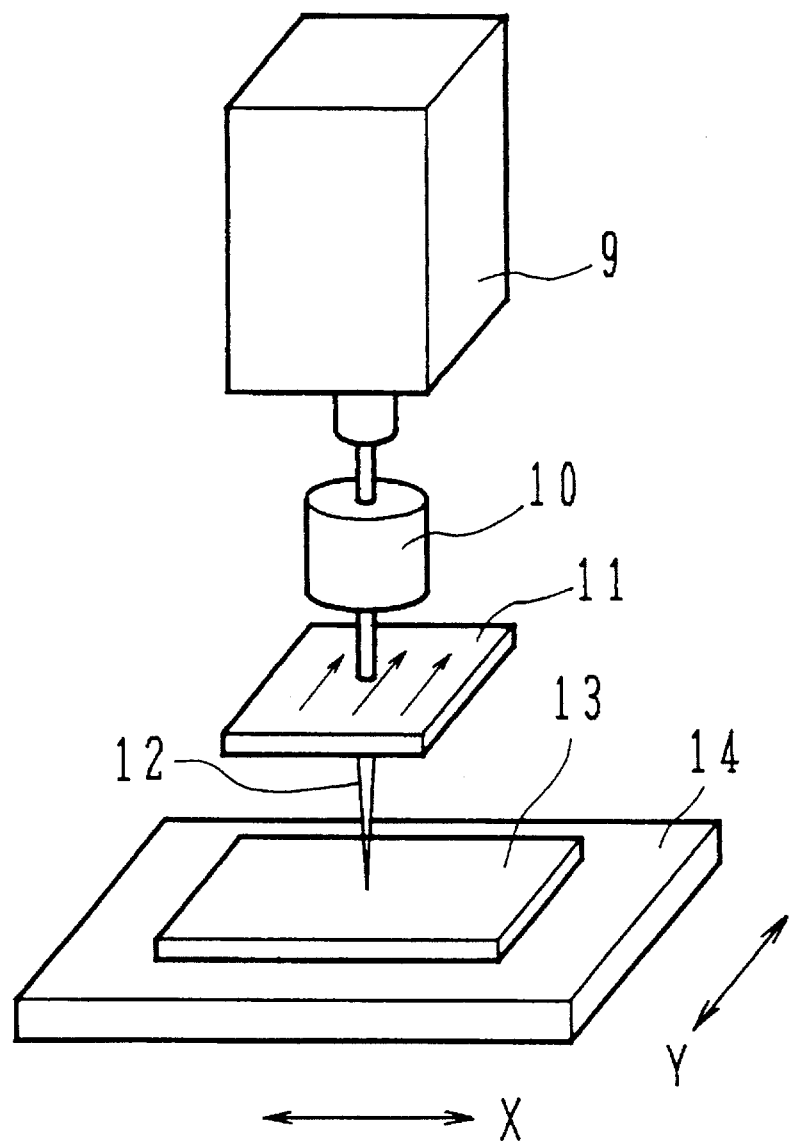
FIG. 3 is a perspective view of a device for performing an orientation treatment on substrates of a liquid crystal display cell according to an embodiment of the present invention.

FIG. 3 shows a device for achieving orientation treatment in the form of micro domains on the optical polarization memory film coated on a substrate. Laser light oscillated from a laser oscillator 9 is converged by an optical system 10 (for example, comprising an aperture with a predetermined shape and lenses). The optical system 10 further has a function of depolarizing the laser light. The optical system 10 transforms the laser light into a laser beam spot with a predetermined dimension and shape. A polarizer 11 transforms the laser beam to a linearly polarized laser light.

The linearly polarized laser light 12 is irradiated as a beam spot on the optical polarization memory film coated on the surface of the transparent glass substrate 13. The beam spot corresponds to each micro domain. Micro domains of the optical polarization memory film irradiated by the laser light memorize the direction of polarization of the laser light.

The glass substrate 13 is placed on a movable stage 14 movable in two-dimensional X and Y directions. In combination with the motion of the movable stage 14, the laser light is scanned on different points of the substrate. The direction of polarization of the laser beam is varied by rotating the polarizer 11 around the optical axis. Orientation directions changed from micro domain to micro domain are memorized in the optical polarization memory film by performing both of the above scanning and rotating operations simultaneously and by irradiating laser light pulses through the polarizer onto the film.

In this case, it is preferable to control simultaneously the angular velocity and direction of rotation of the polarization plate 11, and the direction and the velocity of motion of the movable stage 14 so that the multiplicity of micro domains 1 can be considered to have substantially random orientation directions, in total. For example, every n-th micro domains may be exposed in a first scanning, then different every n-th micro domains be exposed in succeeding scanning, and so on, to expose all the domains after a multiple round of exposures scanning. Alternatively, the angular rotation of polarization direction for consecutive micro domains may be set to have a ratio of non simple integer in relation to 360 degrees. Also, the substrate may be held still, and the laser beam may be scanned on the surface of substrate by means of the optical system such as one utilizing a polygon mirror.

Figure 4:
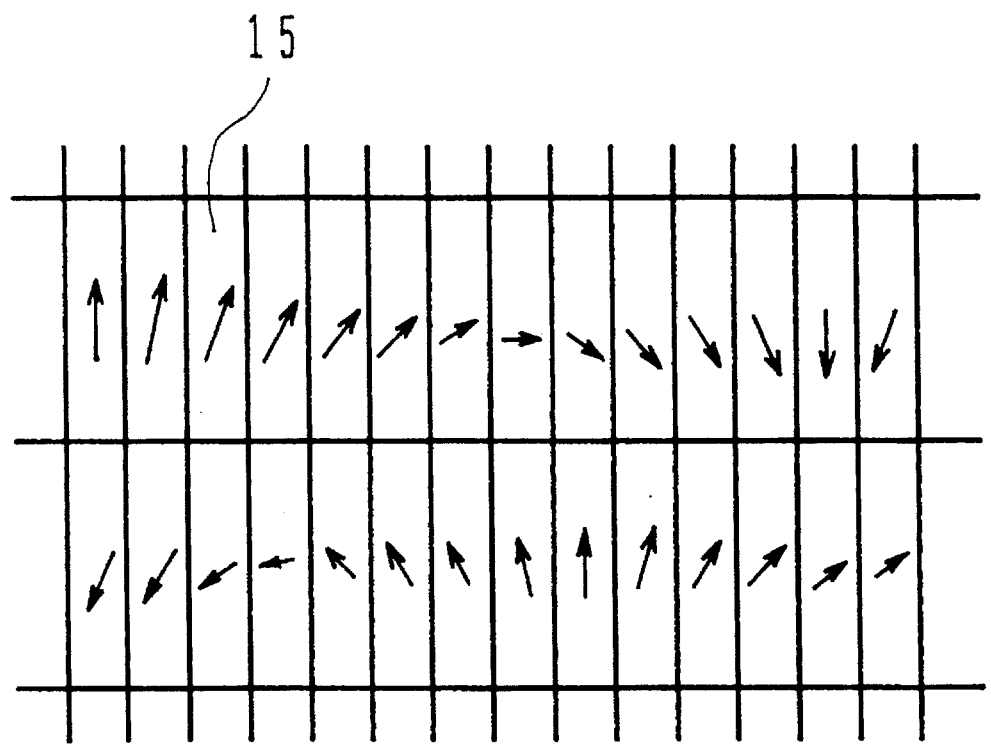
FIG. 4 is an enlarged diagram of a treated state showing the orientation directions of substrates according to an embodiment of the present invention.

FIG. 4 shows an enlarged plan view illustrating orientation configuration on a substrate surface according to another embodiment of the present invention. An orientation layer according to the embodiment cannot be regarded that directions of orientation of adjacent micro domains can be considered to be random, but the directions of orientation in succeeding oblong micro domains 15 are gradually (or continuously) changed, as shown by arrows in the figure. In this treatment, a half turn (rotation) of the direction of polarization is to occur within a sufficiently small range.

The orientation treatment as shown in FIG. 4 can be performed as follows. An oblong slit corresponding to a micro domain 15 is disposed in an optical system 10 as shown in FIG. 3, and the polarizer 11 is rotated constantly at a relative low speed. A polarized laser beam 12 is irradiated in pulses on a substrate which is moved to change location of irradiation successively.

Figure 5:
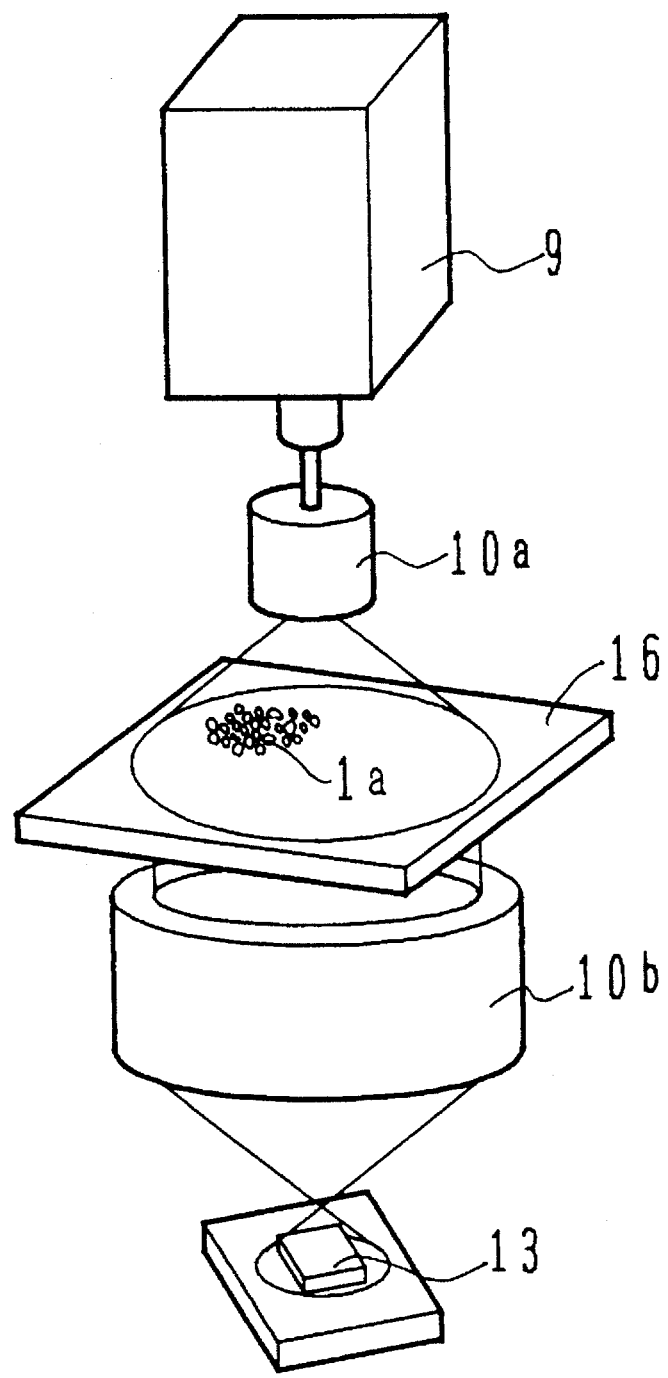
FIG. 5 is a perspective view of another device for performing an orientation treatment on substrates of a liquid crystal display cell according to an embodiment of the present invention.

The system shown in FIG. 3 performs spot irradiation of the laser beam on each micro domain. Such a step-by-step irradiation will require time to irradiate the whole area of the substrate. In FIG. 5, a method of performing orientation treatment as shown in FIGS. 1A to 1F or in FIG. 4 over a considerably wide area of an optical polarization memory film more rapidly is illustrated.

Laser light output from a laser source 9 is expanded by an optical system 10a to yield a predetermined diameter of beam. The magnified laser beam then transmits through a mask 16. The mask 16 is a sort of photomask, and is a polarizer having a multiplicity of polarizer micro domains 1a, which may correspond to any one of FIGS. 1A to 1F for example, and have random direction of polarization as shown in FIGS. 1A to 1F.

The polarized laser light transmitted through the mask 16 is focused by another optical system 10b to be imaged on an optical polarization memory film on a glass substrate 13. Such laser light of various polarization directions can be irradiated simultaneously on a multiplicity of micro domains.

The orientation treatment may either be performed on one or both of the substrates. When the orientation treatment is performed on the optical polarization memory films on both of the substrates, polarization direction of each micro domain on one of the substrates should be adjusted or registered exactly to have a twist of 90° in relation to that on the other substrate. Such adjustment is unnecessary when the orientation treatment is performed on only one of the substrates. The latter may be profitable, industrially.

Figure 6A:
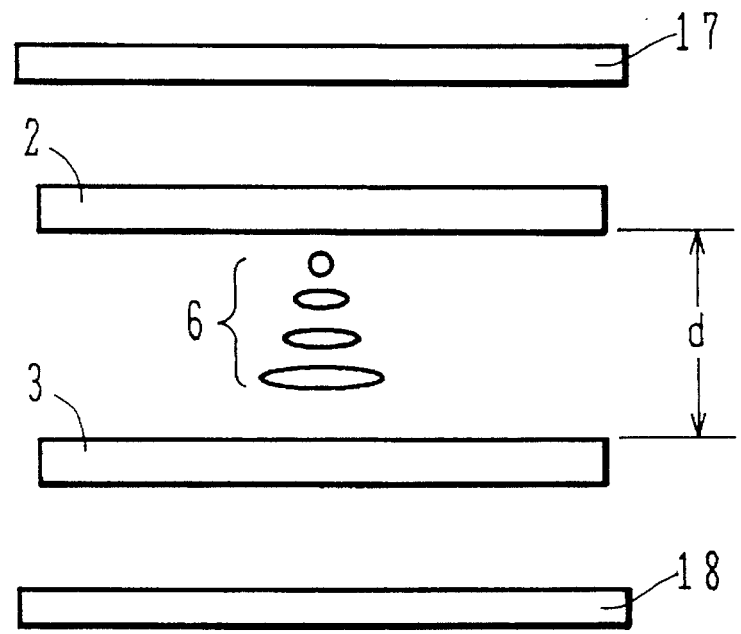
FIGS. 6A and 6B are sectional views of a liquid crystal display cell according to an embodiment of the present invention.
Figure 6B:
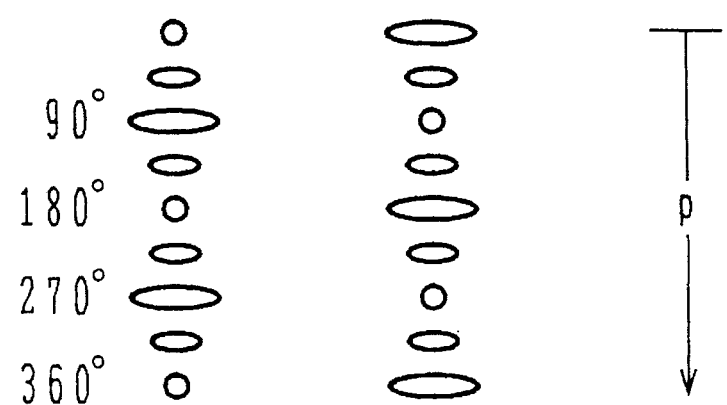

The two substrates finished with the orientation treatment are disposed face to face with gap control means, such as quartz balls or rods, distributed therebetween. FIG. 6A shows a construction of liquid crystal display cell according to the embodiment. In the construction, a pair of glass substrates 2 and 3 are disposed face to face sandwiching a liquid crystal layer 6 having a thickness d. A pair of polarizers 17 and 18 sandwich the glass substrates 2 and 3 therebetween. The thickness d of the liquid crystal layer corresponds to a gap between two glass substrates. Chiral pitch p shown in FIG. 6B is a distance needed for a liquid crystal material to be twisted by 360 degrees.

The thickness d of the liquid crystal layer is preferably designed to satisfy a condition defined by the following formula (1), and more preferably to satisfy further a condition defined by another formula (2):

$$\text{approximately } 0 < d/p < \text{approximately } 0.75 \quad (1),$$

$$0.15 < d/p < 0.75 \quad (2).$$

For example, in a case where a chiral nematic liquid crystal is used as a liquid crystal material, the liquid crystal have a polarization rotation angle from approximately 54 degrees to approximately 270 degrees under a condition which satisfy the formula (2). A condition defined by $d/p = 0.25$ corresponds to a polarization rotation of 90 degrees.

Figure 7:
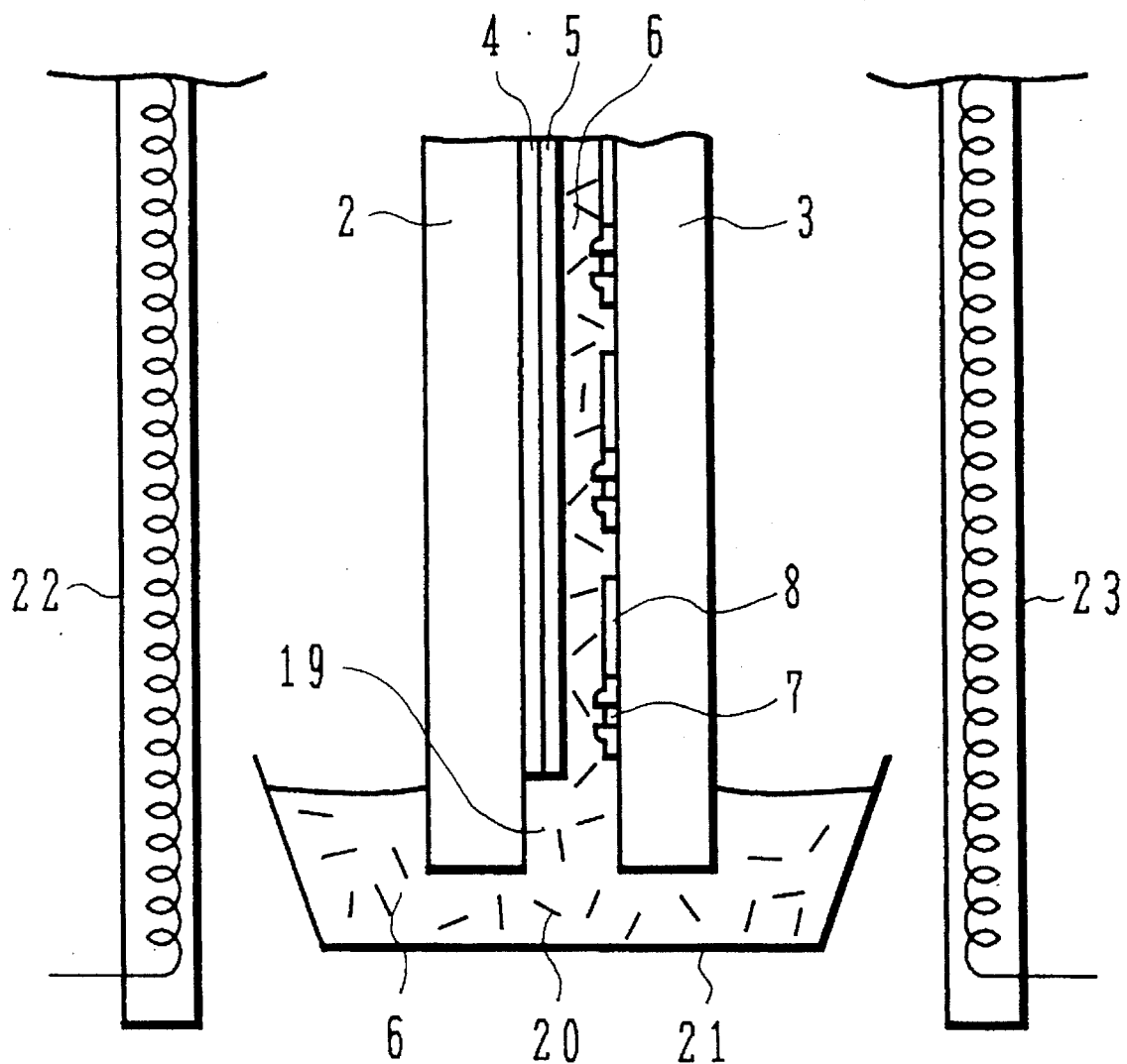
FIG. 7 is a schematic sectional view when a liquid crystal material is injected into a liquid crystal display cell according to an embodiment of the present invention.

FIG. 7 shows in a schematic sectional diagram, a step of injecting liquid crystal material into a liquid crystal cell.

While injecting a liquid crystal material, the liquid crystal material 6 is heated from both sides by heating means 22 and 23 such as heaters. Temperature of heating the liquid crystal material is set to be equal to or higher than the phase transition temperature between nematic phase and isotropic phase of the liquid crystal material (N-I point.)

For controlling the temperature of the liquid crystal, such a control technique of temperature may be employed that regulates amount of electric current in the heating means 22 and 23 while monitoring the temperature within the liquid crystal material by a temperature detector inserted therein. The temperature may either be controlled manually, or automatically.

The heated liquid crystal 6 is injected from an injecting port 19 to a gap between the substrates 2 and 3 using capillarity. Liquid crystal molecules 20 under this condition are isotropic and are not orientated. Here, any other method of injecting the liquid crystal material 6 may be employed, such as vacuum suction.

After injecting the liquid crystal material, the material 6 is gradually cooled by reducing the calorific power of the heating means 22 and 23. Rate of cooling is controlled to reduce the temperature in the range of 0.1°–10 ° C./min, for example, 0.5° C./min. By gradually cooling down the temperature to the phase transition temperature (N-I point) with this rate, the liquid crystal material 6 changes its phase from an original phase of isotropic phase to a nematic phase.

Here, while injecting a liquid crystal, the temperature of the liquid crystal is preferably kept equal to or higher than the phase transition temperature between the nematic (N) phase and the isotropic (I) phase or N-I point of the liquid crystal to keep the liquid crystal in isotropic phase. After the injection, the temperature of the liquid crystal is gradually lowered below N-I point to bring. the liquid crystal into a liquid crystal phase. This process will make the resultant liquid crystal cell better in display than that of injecting liquid crystal in the liquid crystal phase.

Further, it is more preferable to also keep the temperature of the substrate before injection of the liquid crystal equal to or higher than N-I point and to inject the liquid crystal between the substrates. Then, the temperature of the substrates may be gradually lowered below N-I point. The appearance of the resultant liquid crystal cell will be enhanced further by this method.

The injection method described above is suitable to align the liquid crystal molecules along the orientation direction in each micro domain even when an optical polarization memory film has a weak power of orientating the liquid crystal molecules. When the optical polarization memory film has a strong power of orientating the liquid crystal molecules, especially as in the case of having orientation layers on both sides of the substrates, conventional method of injection without heating process may be employed.

The pair of polarizers are to be disposed to have a mutually orthogonal relation of the polarization axes to each other in the case of 90° twist positive display, or a mutually parallel relation in the case of 90° twist negative display. As can be seen from the fact that there is no reference direction of orientation such as rubbing direction on the substrate surface, the direction of polarization axes of the polarizers are not limited to certain directions within a plane parallel to the polarizers, except their mutual relation.

When d/p=0.25, those micro-domains which have orientation direction of liquid crystal molecules on the surface parallel to the polarization direction of incident polarized light transmit polarized light and rotate or twist a polarization direction by 90° because of their optical rotatory power, as is the case in a usual TN cell. Similarly, those micro domains having an orthogonal orientation with respect to the polarization of the incident light will shut off the incident light as in the usual TN cell.

But for those micro-domains which are not in parallel or orthogonal to the polarization direction of incident light, twist angle of the transmitted light is determined by polarization rotating power and retardation Δn·d (where Δ n is the anisotropicity of the refractive index of the liquid crystal layer,) and the twist angle has a wavelength dependency.

Consequently, lights transmitted from the other polarizer after passing through these micro-domains will be colored. However, since the probability of the orientation direction in the multi-domain is equal in every direction, the wavelength dependency of the transmitted light as a whole can be cancelled out. In the case of the positive display, an OFF state gives a non-colored transmission.

Since one of the substrates is provided with an orientation structure, the liquid crystal molecules on the orientation surface are aligned thereto. With respect to a direction of thickness of the liquid crystal layer, the orientation of liquid crystal molecules rotates in accordance with the chiral pitch. A liquid crystal cell of multi-domain type is formed in this way.

The method described above can provide several tens to several hundreds micro domains within a single pixel, which micro domains have different orientation directions. However, even with a smaller number of micro domains within a pixel, it is also possible to attain a more symmetrical visual angle characteristics compared to the conventional art, by suitably selecting the direction of polarization axes of polarizers in relation to the cell.

Namely, by disposing the orientation direction of liquid crystal molecules within certain micro domains at the interface with a substrate and a transmission axis or an absorption axis of the neighboring polarizer in parallel or orthogonal to each other, improvement of visual angle characteristics is attained by a smaller number of orientation directions. Basically, improvement of visual angle characteristics is attained indifferent to the relation between transmission axis of the polarizer and orientation direction of the molecules when there are four or more of orientation directions.

Figure 8A:
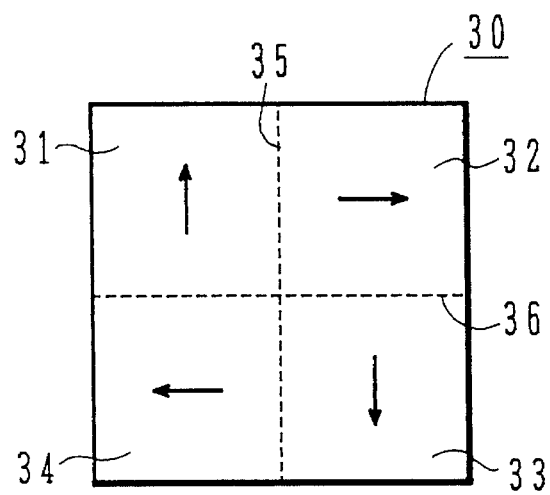
FIGS. 8A and 8B are enlarged plan views showing examples of a treated state of a the orientation directions of substrates according to an embodiment of the present invention.

For example, FIG. 8A is an enlarged plan view showing an example of a configuration of orientation within a pixel at the surface of a substrate. In this embodiment, a pixel region 30 is constituted by four square micro domains 31, 32, 33, 34 having equal area to each other. Orientation direction of each micro domain differs by 90° clockwise, aligned to directions of four sides which constitutes the pixel.

An arrow in each micro domain shown in FIG. 8A denotes orientation direction of the domain. The arrowed end refers to the direction of pre-tilt. Each of a pair of micro domains 31 and 32, and also of a pair of domains 33 and 34, adjacent to each other on right and left bounded by a vertical boundary line 35, has an orientation direction 90° different to each other. Each of another pair of micro domains 31 and 34, and of a pair of domains 32 and 33, adjacent to each other up and down bounded by a horizontal boundary line 36, also has orientation direction 90° different to each other.

By disposing polarization axes of polarizers in parallel or orthogonal to the orientation directions of micro domains, visual angle characteristics becomes effectively more identical in every direction. It is needless to say that combination of four orientation directions within a pixel is not limited to that shown in FIG. 8A, and that similar effect is attained by other configurations. The orientation direction of each adjacent micro domain is different by 90° or 180° to each other.

By setting four orientation directions for micro domains, following effects can be obtained. Since every micro domain can be disposed with a relation in parallel or orthogonal to polarization axes of polarizers, wavelength dependency of transmitted light from each micro domain is minimized, and the problem of coloring of a liquid crystal cell can also be minimized.

In the case of a liquid crystal cell constituted by two kinds of domains having orientation directions of adjacent domains differed by 180°, display may be observed with a reversed black-and-white relation when viewed from an inclined angle from the normal direction of the cell. But no such turnover of display occurs in this embodiment, since the embodiment employs four kinds of domains having orientation directions differed by 90°.

Figure 8B:
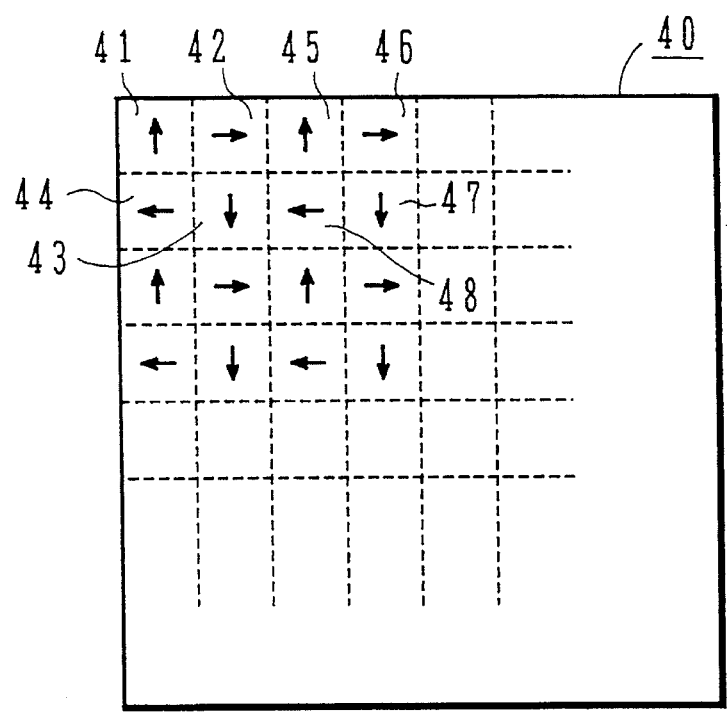

FIG. 8B is an enlarged plan view showing an example of a configuration of orientation within a pixel at the surface of a substrate according to another embodiment of the present invention. In this embodiment, a single pixel region 40 is constituted by micro domains 41–48 . . . disposed in vertical and lateral directions.

Paying attention to a region of four micro domains 41, 42, 43, and 44 (or domains 45, 46, 47, and 48) as a unit region, the unit region is constituted by four micro domains having orientation directions differed to each other by 90° as is similar to the case shown in FIG. 8A.

The substrate of the embodiment shown in FIG. 8B has a pixel 40 constituted by many (or any plural number of) similar unit regions each formed of four micro domains (for example, 41, 42, 43, and 44).

The four micro domains within a unit region are effectively symmetrical with respect to the center of the unit region. This embodiment gives similar effect as obtained by the embodiment shown in FIG. 8A. The effect is also irrespective, as is the case shown in FIG. 8A, to specific way of combining orientation directions of the four micro domains.

In a configuration of micro domains having four orientation directions differed by 90° to each other, as described above, pre-tilt angle can be dispensed with and liquid crystal molecules can be controlled with their orientation utilizing slanted electric field (i.e. fringe field) between electrodes facing each other.

Figure 9A:
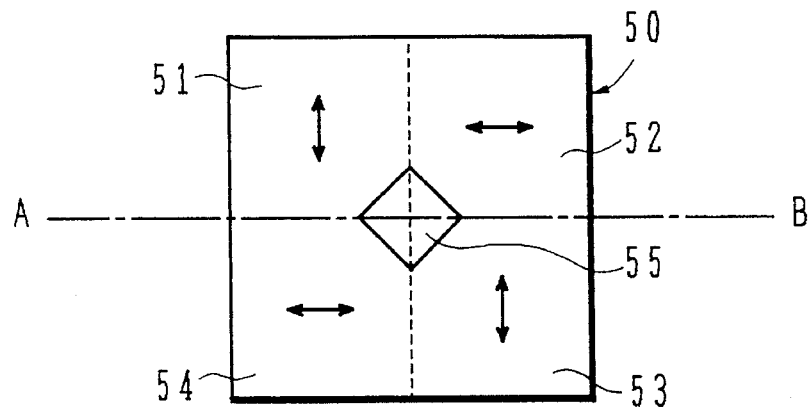
FIGS. 9A to 9E are enlarged plan views showing examples of a treated state of the orientation directions of substrates provided with cut-offs at parts of pixel electrode according to an embodiment of the present invention.

In FIG. 9A, as in FIG. 8A, a pixel region 50 is constituted by four square micro domains 51, 52, 53, 54 having orientation direction of each micro domain differed by 90°. Since the domains have no pre-tilt, an orientation with a reversed direction to that shown in FIG. 8A becomes identical to the one shown in FIG. 8A. There are thus two orientation directions. At the central part of the pixel 50 where the four micro domains touch the others, there is provided a cut-off 55 of one electrode which is formed by eliminating a part of one of the pair of transparent electrodes facing each other. Each pixel corresponds to a pair of transparent electrodes on a pair of the substrates facing each other. The pixel shown in FIG. 9A also shows electrodes comprising transparent, electrodes.

Figure 10:
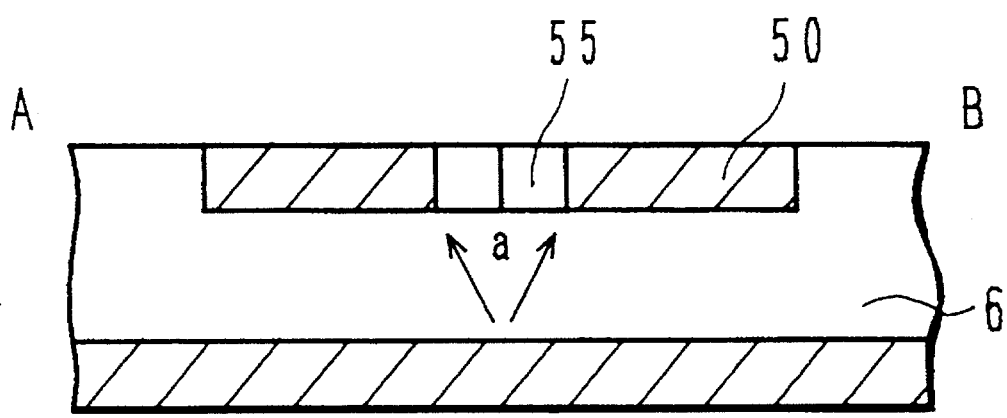
FIG. 10 is an enlarged sectional view showing an example of a inclined electric field generated by a cut-off provided at a part of a pixel electrode according to an embodiment of the present invention.

When a voltage is applied to the electrodes, inclined electric field is established at the periphery of the cut-off 55 of an electrode within a pixel region 50 because the electrode is cut off. FIG. 10 shows an enlarged sectional view corresponding to the pixel 50 cut along the dotted chain line A–B in FIG. 9A. When a voltage is applied between the electrodes on the upper and lower sides sandwiching a liquid crystal layer 6, an inclined electric field (i.e. fringe field) as shown by arrows a is generated at the circumference of the cut-off 55 of the electrode. The generated inclined electric field controls direction of tilt of the liquid crystal molecules. Thus, the liquid crystal molecules can be orientated to the desired direction without giving any pre-tilt angle to the molecules beforehand.

Figure 9B:
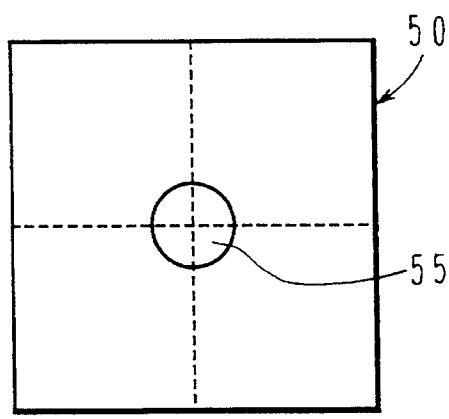
Figure 9C:
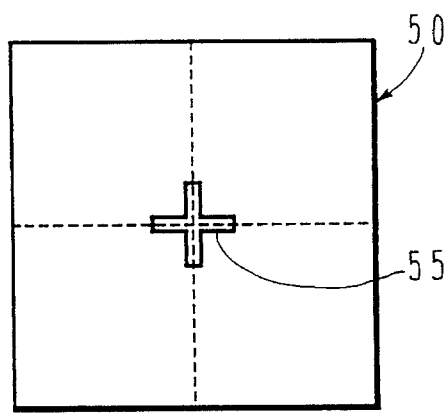

The shape of the cut-off 55 of electrode is not limited to a square, and may be any other shape as a circle, or a cross, as shown by FIGS. 9B and 9C, or any other shape which can regulate direction of tilting up.

Figure 9D:
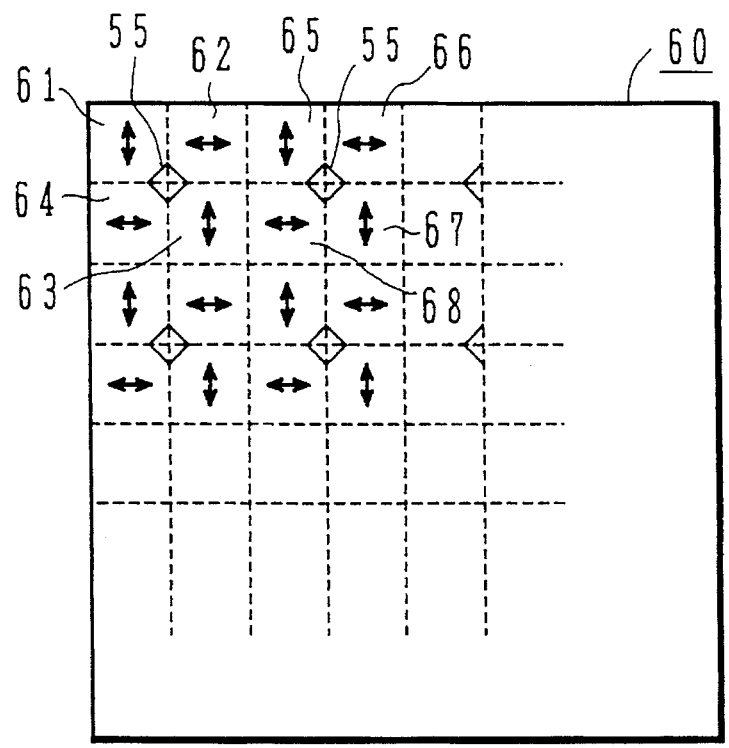

Next, in FIG. 9D, a single pixel region 60 is constituted by a multiplicity of micro domains 61–68 . . . disposed in vertical and lateral directions, similar to the case of FIG. 8B. The region of four micro domains 61, 62, 63, and 64 (or domains 65, 66, 67, and 68), similar to the case shown in FIG. 8B, constitutes a unit region comprising four micro domains having orientation directions differed to each other by 90°.

Many (or any plural number of) similar unit regions with four micro domains (for example, 61, 62, 63, and 64) constitute a pixel 60. In each of the unit regions, a cut-off 55 of electrode is provided around the center by eliminating one of the pair of transparent electrodes facing each other partly at a contact part of all the four micro domains, as is the case shown in FIG. 9A. Similar effect is obtained as in the case shown in FIG. 8B or FIG. 9A.

Figure 9E:
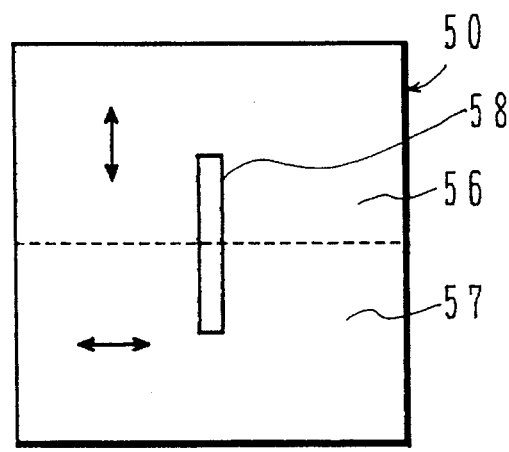

FIG. 9E shows a case wherein two micro domains having orientation directions differed by 90° are formed in a pixel. In this case, a slit-shaped cut-off 58 of electrode is provided at the central part of two micro domains 56 and 57 in a way crossing the boundary between the domains. In this case also, the liquid crystal molecules are controlled to be aligned along the orientation directions shown by arrows because of inclined electric field due to the cut-off 58 of the electrode.

Examples of other orientation configurations will be described hereinunder.

Figure 11A:
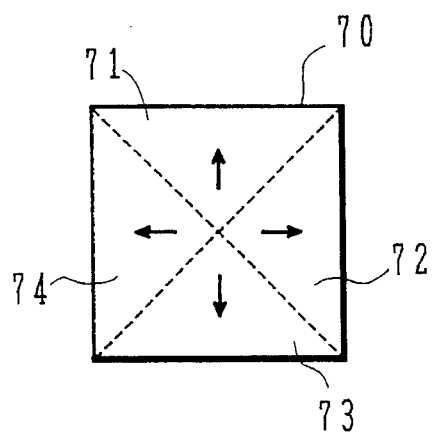
FIGS. 11A to 11C are enlarged plan views showing examples of a treated state of the orientation directions of substrates according to an embodiment of the present invention.
Figure 11B:
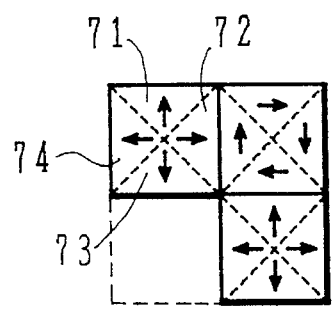
Figure 11C:
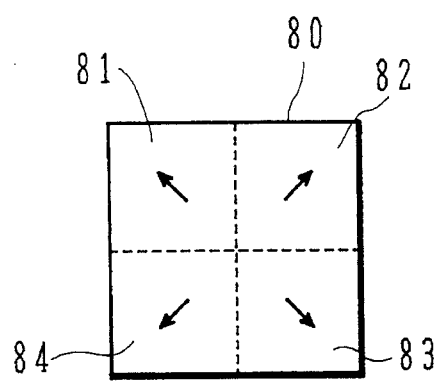

FIGS. 11A, 11B, and 11C show examples of other orientation directions with different shapes of micro domains. Four micro domains form a unit region. Arrows show orientation directions. Any of these orientations yields the similar effect as the embodiments described above.

For a case wherein a unit region constituted of four micro domains forms a square, way of dividing the square into four micro domains by its two diagonals is shown in FIG. 11A. Orientation direction of each of the four micro domains, as shown in the embodiments described above, may be aligned parallel to the sides of the unit region, or in radial directions from the center of the unit region. The orientation directions of adjacent micro domains differ by 90° as is the case described above. Also, as shown in FIG. 11B, plurality of unit regions can be provided in a pixel.

It is needless to say that also for the shape of micro domains in the above mentioned embodiment, namely, in the case of square unit region divided further into four smaller squares with equal area, orientation direction of the four micro domains can be aligned in radial direction. FIG. 11C shows such a configuration.

The present invention is not limited to the constructions or the values described in connection to the above-described embodiments. It will be apparent to those skilled in arts that various substitutions, modifications, changes and improvements can be made based on the above disclosure. For example, in the embodiments described above, twist angle in the liquid crystal layer was set to be 90°. Similar constitution and manufacturing method is valid to the case with different twist angles.

Orientation layers, each having a multiplicity of microdomains may be formed on two substrates. The two orientation layers can be arranged to produce, in combination with the liquid crystal material, such structures of liquid crystal molecules as nematic type, twist nematic type, super twist nematic type, or the like. When the both substrates are provided with the multi-domain orientation layers, usual manufacturing method of liquid crystal display can also be employed in injecting liquid crystal.

The present invention has been described above in relation to preferred embodiments. The present invention is not limited to what has been described in embodiments. It will be apparent to those skilled in arts that various changes, improvements and combinations can be made within the scope and spirit of the appended claims.

We claim:

1. A liquid crystal display cell comprising:

a pair of transparent substrates, a layer of liquid crystal molecules sandwiched between said pair of transparent substrates;

means for positively orientating liquid crystal molecules, disposed on at least one of said substrates and having a multiplicity of micro domains with different orientation directions, the orientation direction being uniform in each micro domain; and orientation directions of said micro domains occur in substantially every direction at substantially equal probability.

2. A liquid crystal display cell according to claim 1, wherein said positive orientation means comprises an optical polarization memory film.

3. A liquid crystal display cell according to claim 2, wherein said positive orientation means is formed on both of said substrates.

4. A liquid crystal display cell according to claim 1, wherein said positive orientation means is formed on both of said substrates.

5. A liquid crystal display cell according to claim 1, wherein said positive orientation means has no pre-tilt, defines a pixel region with two micro domains having a pixel having orientation direction different by 90° to each other, further comprising transparent electrodes disposed on said pair of substrates and having a cut-off portion in one electrode at a part of said transparent electrode at the central part of said unit region, the cut-off portion extending over adjacent domains.

6. A liquid crystal display cell according to claim 1, wherein said liquid crystal layer comprises liquid crystal molecules one of:

aligned to one direction within each micro domain, and twisted by a predetermined angle from a side of one of the substrates to the side of the other of the substrates.

7. A liquid crystal display cell according to claim 1, wherein said liquid crystal layer comprises a nematic or chiral nematic liquid crystal and has a value of d/p, in which p denotes a chiral pitch of said nematic or chiral nematic liquid crystal and d denotes a thickness of the liquid crystal layer in the direction sandwiched by said pair of transparent substrate, which satisfies a formula:

approximately 0<d/p<approximately 0.75.

8. A liquid crystal display cell according to claim 7, wherein said liquid crystal layer comprises a chiral nematic liquid crystal and said value of d/p is at least equal to 0.25.

9. A method of manufacturing a liquid crystal display cell:

forming positive orientation means on at least one of a pair of transparent substrates, which forms a multiplicity of micro domains having different orientation directions to one another, each of said micro domains having a uniform orientation direction; and disposing liquid crystal material between said pair of transparent substrates; and said step of forming a positive orientation means comprises the steps of:

transmitting a laser light through a polarizer mask having distributed multiple micro domains with different polarization directions; and irradiating a transmitted light through said mask on an orientation film having polarization memory characteristics.

10. A liquid crystal display cell comprising:

a pair of transparent substrates, a layer of liquid crystal molecules sandwiched between said pair of transparent substrates;

means for positively orientating liquid crystal molecules, disposed on at least one of said substrates and having a multiplicity of micro domains with different orientation directions, the orientation direction being uniform in each micro domain; and a plurality of pixels;

said positive orientation means defines, on at least one of said transparent substrates, at least one set of four micro domains having a different orientation direction including a pre-tilt angle, within a pixel region; and said four micro domains have orientation directions differing by one of (i) 90° and (ii) 180° between adjacent micro domains.

11. A liquid crystal display cell according to claim 10, wherein a combination of a plurality of unit regions, each comprising said four micro domains, forms a pixel and said four micro domains within said unit region have shapes symmetrical with respect to the center of said unit region.

12. A liquid crystal display cell according to claim 11, further comprising transparent electrodes formed on the surfaces of said pair of substrates in each of said unit regions, one of said transparent electrodes having a cut-off portion of a predetermined shape at a part of said transparent electrode at the central part of said unit region where said four micro domains touch each other.

13. A liquid crystal display cell according to claim 12, wherein said cut-off portion has an elongated portion extending over a boundary between adjacent domains.

14. A liquid crystal display cell according to claim 10, further comprising a pair of polarizers having polarization axes disposed orthogonal to each other, sandwiching said pair of substrates, wherein an orientation direction of one of said micro domains and adjacent one of said polarization axes are in one of (i) parallel and (ii) orthogonal to each other.

15. A liquid crystal display cell according to claim 10, further comprising a pair of polarizers having polarization axes disposed in parallel to each other and sandwiching said pair of substrates, wherein an orientation direction of one of said micro domains and adjacent one of said polarization axes is one of (i) in parallel and (ii) orthogonal to each other.

16. A liquid crystal display cell according to claim 10, wherein a major axis of liquid crystal molecules of said liquid crystal layer is twisted by approximately 90° across the thickness of the layer.

17. A liquid crystal display cell according to claim 10, wherein said four micro domains constitute a pixel region, and said four micro domains are shaped symmetrical with respect to the center of said pixel region.

18. A liquid crystal display cell according to claim 17, further comprising transparent electrodes disposed on each surface of said pair of substrates in said pixel region, one of said transparent electrodes having a cut-off portion at a part thereof which generates a slanted fringe field when an electric voltage is applied between the electrodes.

19. A liquid crystal display cell according to claim 18, wherein said cut-off portion of electrode is disposed at a central part of said pixel where all of said four micro domains touch each other.

20. A liquid crystal display cell according to claim 18, wherein said cut-off of portion has an elongated portion extending over a boundary between adjacent domains.

21. A method of manufacturing a liquid crystal display cell, comprising the steps of:

forming positive orientation means on at least one of a pair of transparent substrates, which forms a multiplicity of micro domains having different orientation directions to one another, each of said micro domains having a uniform orientation direction; and disposing liquid crystal material between said pair of transparent substrates;

wherein said step of forming positive orientation means comprises a step of forming an orientation film having an optical polarization memory characteristic on said at least one transparent substrate, and, while irradiating a polarized laser light of a beam spot of a size of said micro domain on said orientation film having an optical polarization memory characteristic, moving said spot of irradiation to scan said orientation film.

22. A method of manufacturing a liquid crystal display cell according to claim 21, wherein said step of forming positive orientation means forms orientation means on both of said pair of substrates, further comprising a step of disposing said pair of substrates in such a registered relation that a predetermined value of twist angle is generated at respective micro domains between said pair of substrates.

23. A method of manufacturing a liquid crystal display cell according to claim 1, wherein said step of forming positive orientation means further comprises a step of changing direction of polarization of said polarized laser light while moving said point of irradiation of said polarized laser light.

24. A method of manufacturing a liquid crystal display cell according to claim 23, wherein said step of changing direction of polarization includes transmitting said laser light through a polarizer having a predetermined axis of polarization, and rotating said polarizer around an optical axis of said laser light.

25. A method of manufacturing a liquid crystal display cell according to claim 24, wherein said beam spot has an oblong slit-like shape.

26. A method of manufacturing a liquid crystal display cell according to claim 21, wherein said step of disposing the liquid crystal material includes heating said substrates to a temperature equal to or higher than a nematic-isotropic phase transition temperature (N-I point) of said liquid crystal material and injecting said liquid crystal material between said substrates.

27. A method of manufacturing a liquid crystal display cell according to claim 26, wherein said step of disposing the liquid crystal material further includes heating said liquid crystal material equal to or higher than the temperature of N-I point.

28. A method of manufacturing a liquid crystal display cell:

forming positive orientation means on at least one of a pair of transparent substrates, which forms a multiplicity of micro domains having different orientation directions to one another, each of said micro domains having a uniform orientation direction; and disposing liquid crystal material between said pair of transparent substrates; and said step of forming a positive orientation means forms a multiplicity of sets of four micro domains having different orientation directions on at least one of said pair of transparent substrates;

the orientation direction of said four micro domains being different by one of (i) 90° and (ii) 180° between two adjacent micro domains.

29. A method of manufacturing a liquid crystal display cell according to claim 28, further comprising a step of forming transparent electrodes on surfaces of said pair of substrates, one of said transparent electrodes having a cut-off portion in a predetermined shape at a part thereof.

30. A method of manufacturing a liquid crystal display cell:

forming positive orientation means on at least one of a pair of transparent substrates, which forms a multiplicity of micro domains having different orientation directions to one another, each of said micro domains having a uniform orientation direction; and disposing liquid crystal material between said pair of transparent substrates; and said step of forming a positive orientation means comprises the steps of:
  forming transparent electrodes at a pixel region on surfaces of said transparent substrates, and
  forming a cut-off portion of a predetermined shape in a part of one of said transparent electrodes,
  wherein multiple sets of two micro domains having approximately zero tilt and orientation directions different by 90° to each other are formed in the cell.

* * * * *